United States Patent [19]

Schneider et al.

[11] 4,115,298

[45] Sep. 19, 1978

[54] PROCESS FOR SPLITTING UP POLYURETHANE WASTE INTO ACTIVATED POLYHYDROXYL COMPOUNDS

[75] Inventors: Gottfried Schneider; Kuno Wagner, both of Leverkusen; Heinz Wolfgang Patzelt, Memmingen, all of Germany

[73] Assignee: Bayer Aktiengesellschaft, Leverkusen, Germany

[21] Appl. No.: 723,872

[22] Filed: Sep. 16, 1976

[30] Foreign Application Priority Data

Sep. 20, 1975 [DE] Fed. Rep. of Germany ....... 2542022

[51] Int. Cl.$^2$ ..................... C08G 18/82; C08G 18/32
[52] U.S. Cl. ..................... 260/2.3; 521/164; 521/165; 521/167; 528/46; 528/72; 528/73
[58] Field of Search ......... 260/2.3, 2.5 AM, 77.5 AM

[56] References Cited

U.S. PATENT DOCUMENTS

| | | | |
|---|---|---|---|
| 2,917,471 | 12/1959 | Nelson | 260/2.3 |
| 2,937,151 | 5/1960 | Ten Broeck | 260/2.3 |
| 3,632,530 | 1/1972 | Kinoshita | 260/2.3 |
| 3,708,440 | 1/1973 | Frulla | 260/2.3 |
| 3,738,946 | 6/1973 | Frulla | 260/77.5 AT |
| 3,867,373 | 2/1975 | Wagner | 260/293.86 |
| 3,983,087 | 9/1976 | Tucker | 260/2.3 |
| 4,014,809 | 3/1977 | Kondo | 260/2.3 |

FOREIGN PATENT DOCUMENTS 2,238,667 2/1974 Fed. Rep. of Germany.
1,391,891 4/1975 United Kingdom.

*Primary Examiner*—C. Warren Ivy
*Attorney, Agent, or Firm*—Gene Harsh; Joseph C. Gil; R. Brent Olson

[57] ABSTRACT

The instant invention relates to a new process for splitting up polyurethane waste into activated polyhydroxyl compounds which may be reused for the production of polyurethane plastics. The process broadly comprises reacting the polyurethane waste with lactams or equilibrium associates of lactams and active hydrogen containing compounds at temperatures of from 150° to 250° C. If desired, the process may be conducted under elevated pressure.

13 Claims, No Drawings

PROCESS FOR SPLITTING UP POLYURETHANE WASTE INTO ACTIVATED POLYHYDROXYL COMPOUNDS

BACKGROUND OF THE INVENTION

The considerable growth of the polyurethane industry has seen an equally considerable increase in the problem of eliminating and reusing polyurethane waste and polyurethane rejects. Although a market has been found for chips of soft polyurethane foam waste by bonding together the chips to form composite materials, it is nevertheless only possible in this way to use a limited quantity of soft-foam material. Unfortunately, there are no similar opportunities for utilizing waste of semi-hard and hard polyurethane foams or elastomer granulates. Accordingly, large quantities of polyurethane waste and rejects from the manufacture of hardened soft foams and elastomers must be dumped in waste collecting areas or destroyed in incinerators. Unfortunately, this gives rise to considerable ecological, technical and economic problems because of the low specific gravity and, hence, large volume of the waste and rejects. Accordingly, both for ecological and economical reasons, there is considerable interest in economically recycling the steadily increasing quantities of polyurethane waste.

German Offenlegungsschriften Nos. 2,362,919; 2,362,920 and 2,362,921 relate to processes for hydrolyzing polyurethane foam waste with steam at high temperatures for material salvage purposes. Unfortunately, these processes require high temperatures and pressures (for example 240° C. and 40 atms), so that splitting up the polyurethane waste in this way can only be achieved at considerable expense and with an equally considerable outlay on apparatus. In addition, the reaction products accumulate in admixture with water so that they have to be separated off by special processes before they can be reused.

It is also known (U.S. Pat. No. 3,738,946) that polyurethane foam waste can be degraded into refoamable polyols by heating to 175°-250° C. in high-boiling dihydroxy compounds, preferably diethylene glycol, and advantageously in the presence of approximately 10% of a diethanolamine. In this way, it is possible by transurethanization to obtain short-chain polyols which, however, are only advantageously used for the production of hard polyurethane foams. According to the teaching of the above-mentioned U.S. patent the process is only advantageously used for splitting up hard polyurethane foams. Another disadvantage of this process is that it takes several hours to complete the reaction. Accordingly, the process uses a considerable amount of energy and cannot be readily worked in continuous installations.

It is known from German Offenlegungsschrift No. 2,238,667 that polyurethane foams can be linearized by impregnating the foam particles with lactams or lactam addition compounds in a matrix reaction. In this reaction, the chain-branching bonds (except for the isocyanurate group) are selectively split into polyurethane plastics, such as biuret, allophanate, uretonimine and uretdione groups. This reference clearly indicates, however, that chain-extending bonds, such as urethane and urea groups, and the isocyanurate bonds, are not affected.

In Agnew, Makrom Chemie 37, 59–88 (1974), it is noted that, according to exhaustive tests on low molecular weight test substances in the temperature range from 20° to 130° C., lactam associates split the above-mentioned chain-branching bonds very quickly, whereas they do not split urethane and urea bonds at all.

British Patent No. 1,308,468 describes a number of so-called matrix reactions on polyurethane foams. For example, it is disclosed that ε-caprolactam can be polymerized in a foam matrix (cf. Example 10 of British Patent No. 1,308,468), apparently without the polyurethane bonds being destroyed.

DESCRIPTION OF THE INVENTION

It has now been extremely surprisingly found that polyurethanes (both of the cellular and of the non-cellular type) can be degraded extremely quickly at temperatures only slightly higher than those mentioned in the literature references cited above, i.e. at about 150° to 250° C. and preferably at from 165° to 210° C., with lactam melts or, preferably, with equilibrium associates of lactams and water or other adduct formers containing at least two Zerewitinoff-active hydrogen atoms, whose production is described in British Pat. Nos. 1,391,891 and 1,367,023 and U.S. Pat. Nos. 3,867,373 and 3,758,444, (the disclosures of which are herein incorporated by reference) to form activated polyhydroxyl compounds. It has been found that not only all the chain-branching bonds, but also the chain-extending bonds (urethane and urea groups) are split, as reflected in the relatively high OH-numbers, the low viscosities and the presence of basic nitrogen in the end products. Since the isocyanurate and carbodiimide groups are also split at the same time, hard polyurethane foams containing these groups may be readily converted into NCO-reactive compounds. Organic-inorganic plastics, of the type described in German Offenlegungsschrift No. 2,325,090, can also be degraded according to the instant invention. With the exception of the splitting reaction carried out with equilibrium associates of lactams and water, where it is best to apply elevated pressure, there is no need for the degrading reactions to be carried out under elevated pressure.

The ultimate products formed from the instant invention are viscous to highly viscous liquids. Their average molecular weights substantially correspond to the average molecular weights of the polyols used in the production of the degraded polyurethanes. They may be used either alone or in admixture with other polyhydroxyl compounds such as polyether polyols, polyester polyols or low molecular weight polyols, as the polyol component in the production of new, soft, semi-hard and hard foams by the isocyanate polyaddition process. They may also be used as the polyol component in the production of flexible polyurethane elastomers.

Accordingly, the present invention relates to a process for splitting up cellular and non-cellular polyurethane waste and polyurethane rejects into reusable starting materials for the isocyanate polyaddition process, distinguished by the fact that the polyurethane is reacted at 150° to 250° C. and preferably at 165° to 210° C., optionally under elevated pressure, with lactam melts or equilibrium associates between lactams and adduct formers containing at least two Zerewitinoff-active hydrogen atoms.

The lactam equilibrium associates with adduct formers containing Zerewitinoff-active hydrogen atoms which are used in the process according to the invention act on the urethane, urea, biuret and allophanate bonds both through the lactam component and also through the hydroxyl-group- or amino-group- containing component present in activated form.

It was surprisingly and totally unexpected that not only do transurethanization and linearization reactions of the type known from German Offenlegungsschrift No. 2,238,667 and U.S. Pat. No. 3,738,946 occur, but also that NCO-reactive compounds containing primary and secondary amino groups in addition to hydroxyl groups are formed with elimination of carbon dioxide. While not wishing to be bound by the exact chemistry, it is theorized that the splitting reactions take place in accordance with the following reaction scheme (shown in idealized form for a urethane group):

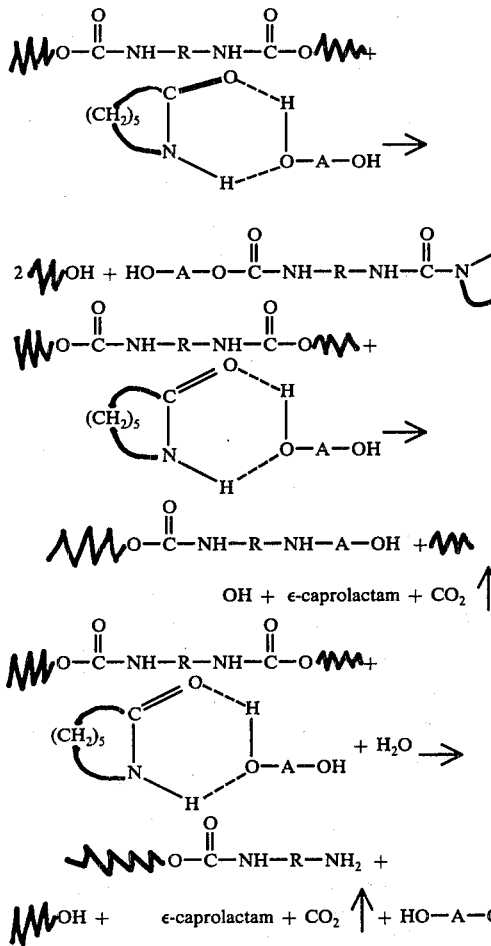

In the above formula scheme, R represents a difunctional organic radical of the type formed by removing the NCO-group from a diisocyanate; similarly A represents the difunctional organic radical of a diol.

As shown by analytical data, the polyhydroxyl compounds produced in accordance with the instant invention generally contain at least about 0.5% by weight of primary amino groups (and correspondingly more in the case of the degradation of polyureas). These materials are so highly activated with respect to isocyanates that, for example, when they are reused for the production of soft or hard foams, there is no need for the usual special catalyst of the type known in the art to be added. These catalysts are generally very expensive fine chemicals. Accordingly, the use of the polyhydroxyl compounds produced in accordance with the invention as the polyol component in the production of polyurethane foams is also highly economical for this reason.

The lactam present in the polyol mixtures obtained in accordance with the invention (generally in a quantity of about 5 to 40% by weight and preferably in a quantity of from 15 to 20% by weight) also increases the reactivity of any water added with respect to isocyanates, so that the blowing reaction on which foaming is based is considerably accelerated.

By suitably carrying out the reaction, i.e. at elevated temperatures, and/or in the presence of basic catalysts known per se, part of the lactam used may be polymerized during and/or after the degrading reaction according to the invention into polyamides which are present as a fine dispersion in the polyol mixtures formed in accordance with the invention. In this case, the reaction mixture is generally kept for about 5 minutes to 1 hour at approximately 200° to 250° C. and preferably at about 210° to 220° C. Polyamide dispersions of this type may be used for the production of foams with increased elasticity or, with particular advantage, for the production of polyurethane elastomers of high flexibility. In cases where organic-inorganic plastics, of the type described in German Offenlegungsschrift No. 2,325,090, are split up, finely divided dispersions of silica in the NCO-reactive compounds are obtained and may also be used for the production of polyurethane plastics.

According to the invention, suitable lactams are, for example, compounds corresponding to the general formula:

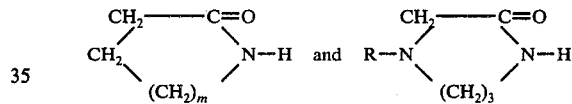

in which $m$ is an integer from 0 to 9 and

R represents an aliphatic radical, preferably a $C_1$-$C_{10}$ aliphatic radical, an araliphatic (preferably containing 6 to 12 carbon atoms) or a pyridine radical, optionally substituted by a $C_1$-$C_4$ alkyl group.

Particularly suitable lactams are lactams of ω-amino carboxylic acids, such as 3-aminopropionic acid, 4-aminobutyric acid, 5-aminovaleric acid, 6-aminocaproic acid, 10-aminocaproic acid; N-substituted aza lactams, such as 1-N-methyl hexahydro-1,4-diazapin-3-one, 1-N-butyl hexahydro-1,4-diazapin-3-one, 1-N-α-pyridyl hexahydro-1,4-diazapin-3-one, etc. Preferred lactams are butyrolactam, valerolactam, 1-N-methyl hexahydro-1,4-diazapin-3-one and, in particular, ε-caprolactam.

As described in British Pat. No. 1,391,891 and U.S. Pat. No. 3,867,373, (the disclosures of which are herein incorporated by reference) the lactam equilibrium associates preferably used as degradation reagents in accordance with the invention are produced simply by mixing the lactams or azalactams with the particular adduct former at temperatures of from 0° to 100° C., preferably at temperatures of from 30° to 70° C. It is preferred to use from 0.3 to 4 mols of the adduct former per mol of the lactam or azalactam.

In addition to water, adduct formers suitable for use in accordance with the invention are compounds containing at least two Zerewitinoff-active hydrogen atoms, of the type described for example in German Offenlegungsschrifts No. 2,238,667 (Example 1) and 2,117,576; British Pat. Nos. 1,391,891 and 1,367,023 and U.S. Pat. Nos. 3,867,373 and 3,758,447. Specific examples of Zerewitinoff-active components preferably used in accordance with the invention include ethylene glycol, diethylene glycol, thiodiglycol, the isomeric propane diols, di- and tri-propylene glycol, glycerol, trimethylol propane, 1,6-hexane diol and isomers of hexane diol, hexahydroquinone, 1,4-bis-hydroxy methyl cyclohexane, methylene glycol and the bis-semiacetals of formaldehyde of the above-mentioned polyhydroxyl compounds. It is particularly preferred to use ethylene glycol and diethylene glycol, and mixtures of these compounds. Preferred dialcohols containing amino groups include diethanolamine, N-methyl diethanolamine and triethanolamine. Water may also be used as the Zerewitinoff-active component. In this case, however, the splitting reaction generally has to be carried out under elevated pressure (preferably at about 4–50 bar).

It is possible, but not necessary, to use catalysts to accelerate the process according to the invention. As mentioned above, the presence of strongly basic catalysts during the reaction by which the polyurethane is degraded results in partial polymerization of the lactam used.

The following represent preferred catalysts: the alcoholates, phenolates, hydroxides and carbonates of Na, K, Li, Zn, Mg and Al; the salts of these metals with organic acids, such as acetic acid, propionic acid, butyric acid or stearic acid; the K- and Na-salts of isononyl phenol and p-nitrophenol; sodium and potassium carbonate, sodium and potassium salts of mercapto compounds, and complexes of acetoacetic ester, acetyl acetone, and the like with, for example, Al, Bi, Zn, Cu or Mn.

From the group of tertiary amines, it is possible in principle to use any catalysts known for use in isocyanate reactions because they also catalyze the degradation reaction according to the invention. Preferred tertiary amines include triethylamine, tributylamine, N-methyl morpholine, N-ethyl morpholine, N-cocomorpholine, N,N,N',N'-tetramethyl ethylene diamine, 1,4-diazabicyclo-(2,2,2)-octane, N-methyl-N'-dimethyl aminoethyl piperazine, bis-(2-(N,N-dimethylamino)-ethyl)-ether, N,N-dimethyl benzyl amine, bis-(N,N-diethyl aminoethyl)-adipate, N,N-diethyl benzyl amine, pentamethyl diethylene triamine, N,N-dimethyl cyclohexyl amine, N,N,N',N'-tetramethyl-1,3-butane diamine, N,N-dimethyl-$\beta$-phenyl ethylamine, 1,2-dimethyl imidazole, 2-methyl imidazole, and silamines having carbon-silicon bonds of the type described, for example, in German Pat. No 1,229,290 (2,2,4-trimethyl-2-silamorpholine and 1,3-diethyl aminomethyl tetramethyl disiloxane being examples of suitable silamines).

Other suitable catalysts are tertiary amines containing active hydrogen atoms such as triethanolamine, N-ethyl diethanolamine, dimethyl ethanolamine, and their reaction products with propylene oxide and/or ethylene oxide. As already mentioned, tertiary amines having at least two active hydrogen atoms, such as triethanolamine, may also be used as the Zerewitinoff-active component of the lactam addition compounds. In this case, the splitting reaction takes place very quickly, even in the case of hard foams and polyisocyanurate foams.

Instead of using amines, it is also possible to use other nitrogen-containing bases of the type known in the art such as tetraalkyl ammonium hydroxides or even hexahydrotriazines as catalysts.

The reactions according to the instant invention are also catalyzed by organotin compounds, such as stannous salts including tin(II)octoate, tin(II)ethyl hexoate, tin(II)valerate, tin(II)acetate and tin(II)laurate; or dialkyl tin salts of carboxylic acids such as, dibutyl tin acetate, dibutyl tin dilaurate, dibutyl tin maleate or dioctyl tin diacetate.

Other suitable catalysts include zinc chloride, calcium chloride, magnesium chloride, tin(II)chloride and lithium iodide. All the catalysts may be used in quantities of from about 0.0005 to 4% by weight (based on the polyurethane scrap).

To carry out the process of the instant invention, the polyurethane waste and/or the polyurethane rejects are suitably size-reduced by cutting, tearing or grinding in order to increase the surface of the particles and thereby to accelerate the splitting reaction. These particles are then added to the lactam or lactam equilibrium associate which has been preheated to the reaction temperature indicated, preferably in such a way that new particles are only added after the others have been dissolved in the lactam or lactam equilibrium associate. In the case of relatively small batches and at the beginning of the reaction, the polyurethane particles may even be introduced into cold or moderately heated lactam or lactam equilibrium associate and heated with it to the reaction temperature. At the temperatures indicated, the splitting reactions are often completed after only a matter of seconds and in less favorable cases, after a few minutes, even in the absence of catalysts.

At a temperature of 165° C., soft-foam chips for example dissolve in lactam equilibrium associates in only about 5 seconds, whereas heavily crosslinked hard foams generally take from 1 to 2 minutes.

Up to about 2 parts by weight of polyurethane plastics may be added to 1 part by weight of lactam or lactam equilibrium associate. However, in cases where the reaction mixture contains large quantities of polyurethane the viscosity increases so that the wetting of the polyurethane particles decreases and the reaction takes slightly longer than the times mentioned above. However, even this effect is only noticeable after a relatively large quantity of polyurethane has been introduced and may readily be eliminated by using suitable stirrers and kneaders.

Preferably, a total of about 0.5 to 1 part by weight of polyurethane is mixed with 1 part by weight of lactam or lactam equilibrium associate. The viscosity of the end products is generally in the range from about 1000 to 100000 cP, preferably 3000 to 700000 cP, at 20° C.

In principle, it is also possible to adopt the reverse procedure, i.e. to mix all the polyurethane with the lactam or lactam equilibrium associate or to add the lactam or lactam equilibrium associate to the polyurethane. However, this procedure is not recommended, especially in the case of foams because of their large volume.

By following the instant invention, it is possible to transform polyurethane plastics waste and rejects into NCO-reactive compounds in the absence of pressure, using simple stirrer-equipped apparatus. By virtue of the simple nature of the process, manufacturers or processors of polyurethane plastics are now able to directly convert waste into reusable products, thereby reducing storage, transportation and disposal costs. In addition, the fact that there is no longer any need to dump polyurethane waste, contributes considerably towards reducing pollution.

One particular advantage of the process according to the invention is that it can be carried out continuously by virtue of the very fast splitting reaction. In a preferred embodiment of the process according to the invention, polyurethane waste and lactams or lactam equilibrium associates are introduced together or at separate points into a screw machine which is preferably provided with venting means in front of the feed zone (looking in the direction of flow), to remove the air introduced with the polyurethane. The advantage of this is that no air-induced, secondary reactions can occur during the degradation reaction. Suitable machinery of this type are known in the polyurethane art.

Especially in cases where pressure is applied (for example where lactam-water equilibrium associates are used), the process is advantageously carried out in machines of the type described in DOS No. 2,442,387. In cases where this machinery is used, it is readily possible by carrying out a simple preliminary test to assess how the residence time of the reaction mixture and the temperature distribution in the extruder should be adapted to one another to ensure that the polyurethane introduced undergoes complete degradation.

The following Examples are intended to illustrate the process according to the invention and the usefulness of the polyols produced in accordance with the invention. Unless otherwise indicated, the figures quoted are parts by weight or percent by weight.

EXAMPLE 1

The foam waste used for this Example came from a soft, open-cell polyether-polyurethane foam which was produced as follows:

100 parts by weight of a polyether having an OH-number of 49 synthesized from propylene oxide and ethylene oxide with 1,2-propylene glycol and trimethylol propane as starter, 4 parts by weight of water, 1.2 parts by weight of a polyether siloxane (obtained by ethoxylation of a polydimethylsiloxane carrying terminal $CH_2OH$-groups), 0,2 parts by weight of triethylene diamine and 0,25 parts by weight of the tin(II) salt of 2-ethyl caproic acid, are thoroughly mixed with one another. 50 parts by weight of tolylene diisocyanate (80% of 2,4- and 20% of 2,6-isomer) are added to this mixture, followed by thorough mixing using a high-speed stirrer. The foaming reaction begins after a cream time of approximately 10 seconds, producing a white, soft elastic polyurethane foam which has open cells, a density of 38 kg/m³ and is theoretically cross-linked with an excess of 0.02 NCO-equivalents (Index 102). The foam is heated for 2 hours at 100° C. 250 g of chips of this foam are introduced in portions into a vessel which is equipped with a stirrer, reflux condenser and internal thermometer and which has been filled beforehand with 250 g of an equilibrium associate of equimolar quantities of $\epsilon$-caprolactam and ethylene glycol and heated to a temperature of 190° C. The reaction takes place immediately, accompanied by gentle foaming, and is over after only a few seconds, as reflected in complete dissolution of the chips. A polyhydroxyl compound having a viscosity $\eta$ at 20° C. of 1475 cP, an OH-number of 130 and a basic nitrogen content of 0.73% is obtained in this way.

This NCO-reactive compound may be used as "polyol" component in an isocyanate polyaddition process and either on its own or in admixture with other polyols yields soft or hard polyurethane foams or flexible polyurethane elastomers, depending on the application envisaged, the procedure adopted and the number of reactants.

EXAMPLE 2

2,000 g of chips of a soft, elastic open-cell polyurethane foam, produced as described in the preceding Examples, are introduced as in Example 1 into 1,000 g of $\epsilon$-caprolactam equilibrium associate, (consisting of 636 g of $\epsilon$-caprolactam and 364 g of ethylene glycol), followed by degradation in the same way as in Example 1. The end product develops two phases. Both phases represent activated polyhydroxyl compounds which may be used individually, in admixture with one another or with other polyhydroxyl compounds known per se, as the polyol component of a variety of different polyurethane plastics which may be produced by the isocyanate polyaddition process: Phase I: OH-number = 252, basic nitrogen = 2.03% by weight viscosity at 20° C. = 1,236 cP.

Phase II: OH-number = 572, basic nitrogen = 3.61%, viscosity at 20° C. = 6.746 cP.

EXAMPLE 3

1,500 g of chips of a polyurethane foam, produced as described in Example 1, are introduced into 1,000 g of $\epsilon$-caprolactam equilibrium associate, (consisting of 506 g of $\epsilon$-caprolactam and 494 g of diethylene glycol), followed by degradation in the same way as in Example 1.

By careful phase separation, it is possible to separate from the reaction product the thus obtained three phases which all represent activated polyhydroxyl compounds and which may be used individually, in admixture with one another or with other polyhydroxyl compounds as the polyol component for the production of polyurethane plastics. Phase I: OH-number = 154, basic nitrogen = 0.71%, viscosity at 20° C. = 1242 cP;

Phase II: OH-number = 364, basic nitrogen = 2.32%, viscosity at 20° C. = 15,710 cP;

Phase III: OH-number = 259, basic nitrogen = 1.46%, viscosity at 20° C. = 69,450 cP.

EXAMPLE 4

The foam waste used in this Example came from a closed-cell hard polyurethane foam which was produced as follows:

75 parts of a polyether having an OH-number of 380 synthesized from propylene oxide with a mixture of saccharose, trimethylol propane and water as starter, 15 parts of a polyhydroxyl compound (OH-number 450) started on the reaction produce of diethyl phosphite, formaldehyde and diethanolamine, of the formula

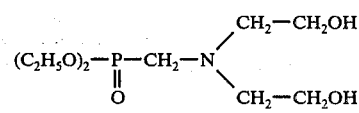

10 parts of castor oil, 1 part of an aqueous solution of the sodium salt of sulphonated ricinoleic acid, 2 parts of a standard commercial grade disersant which is believed to have the formula

1,5 parts of the polyether siloxane of Example 1, 28 parts of dichlorodifluoromethane and 0,8 part of triethylamin, are thoroughly mixed. 110 parts of a commercial-grade diphenyl methane diisocyanate having an isocyante content of 31% are added to this mixture, followed by thorough mixing with a high speed stirrer. A hard, yellow to brownish, closed-cell polyurethane foam having a density of 28 to 30 kg/m$^3$ is formed after a cream time of about 10 to 20 seconds. after a hardening time of several days, this hard polyurethane foam is ground into relatively small particles. 1,000 g of these foam particles are introduced into 1,000 g of ε-caprolactam equilibrium associate, (consisting of 636 g of ε-caprolactam and 364 g of ethylene glycol), followed by degradation in accordance with Example 1. A highly viscous polyhydroxyl compound is obtained and may also be used for the production of a variety of different polyurethane plastics, although it is preferably used for the production of hard polyurethane foams.

The quantity of the polyurethane waste introduced into the caprolactam equilibrium associate may of course be further increased. In that case, however, products having relatively high viscosities are obtained. With a ratio of for example, 1.3 parts of polyurethane to 1 part of caprolactam equilibrium associate, a polyhydroxyl compound having an OH-number of 408 and a viscosity η at 20° C. of more than 300,000 cP is obtained.

However, in admixture with conventional polyesters, polyethers or low molecular weight polyols, of the type known per se in polyurethane chemistry, these products may also be used for the production of new polyurethane plastics.

EXAMPLE 5

This Example shows how it is possible, by carrying out the reaction under suitable conditions, for part of the ε-caprolactam added to be polymerized into polyamide dispersed finely in the reaction product, whereby the polyurethane plastics produced from the reaction product show improved elasticity and compression hardness.

350 g of polyurethane foam particles of the hard polyurethane foam described in Example 4 are introduced at 190° C. into 1,000 g of an equilibrium associate of 636 g of ε-caprolactam and 364 g of ethylene glycol. After the polyurethane foam particles introduced have dissolved in the lactam equilibrium associate, the temperature is increased to 205° C. and the mixture kept at that temperature for a period of 30 minutes. A wax-like, polyamide-containing substance having an OH-number of 560 is obtained after cooling.

The polyhydroxyl compound thus obtained may be reacted in known manner with 4,4'-diphenyl methane diisocyanate or with 2,6-tolylene diisocyanate to form new polyurethane plastics which are distinguished by their increased elasticity and improved compression hardness.

EXAMPLE 6

This Example shows that not only the chain-extending and, according to the teaching of German Offenlegungsschrift No. 2,238,667, the labile chain-branching isocyanate bonds, but also the basically very stable isocyanurate group and the carbodiimide groups, can be split by the process according to the invention. The hard polyester polyurethane foam used in this Example was produced in such a way that it contains approximately 5% of isocyanurate groups and 6% of carbodiimide groups:

25 parts of a polyester having an OH-number of 300 synthesized from HET acid and ethylene glycol, 12 parts of trichloroethyl phosphate, 1.5 parts of the polyether siloxane of Example 1, 1 part of glycerol and 1.5 parts of a 25% solution of potassium acetate in diethylene glycol, are thoroughly mixed with 20 parts of trichlorofluoromethane. 100 parts of an isocyanate prepolymer, produced from commercial-grade diphenyl methane diisocyanate with an isocyanate content of 31% and a sucrose polyether polyol having an OH-number of 210 are added to this mixture, followed by thorough mixing with a high-speed stirrer.

A hard, closed-cell polyurethane foam (isocyanate index 200) is formed, containing approximately 5% of isocyanurate bonds and having a density of 35 kg/m$^3$.

200 g of chips of this polyurethane foam are introduced in portion at 175° C. into an equilibrium associate of 500 g of ε-caprolactam and 256 g of N-methyl diethanolamine. After 2 minutes the portions of foam particles added have dissolved so that more foam can be added. A liquid having a viscosity η at 20° C. of 2184 cP, an OH-number of 440 and a basic nitrogen content of 5% is obtained in this way. This liquid may be used in the absence of further activators as polyhydroxyl component for new polyurethane plastics.

The quantitative ratio of foam introduced to lactam equilibrium associate may of course be further increased. In that case, however, the products obtained show a considerable increase in viscosity.

EXAMPLE 7

150 g of chips of a polyurethane foam, produced as described in Example 1, are introduced as in Example 1 into 150 g of γ-butyrolactam equilibrium associate (consisting of 86,7 g of γ-butyrolactam and 63,3 g of ethylene glycol), followed by degradation in the same way as in Example 1. A polyhydroxyl compound is obtained having an OH-number of 399 and a viscosity of 3770 cP/20° C.

EXAMPLE 8

150 g of chips of a polyurethane foam, produced as described in Example 4, are introduced into 150 g of the lactam equilibrium associate of Example 7, followed by degradation in the same way as in Example 1. A polyhydroxyl compound is obtained having an OH-number of 491 and a viscosity of 25360 cP/20° C.

EXAMPLE 9

150 g of chips of a polyurethane foam, produced as described in Example 1, are mixed with 150 g of a lactam equilibrium associate consisting of 129,4 g of ε-caprolactam and 20,6 g of water and are heated to 190° C. in an autoclave which is equipped with a stirrer. Heating is continued for 30 minutes. A polyhydroxyl compound is obtained having an OH-number of 290 and a viscosity of 636 cP/20° C.

What is claimed is:

1. A process for splitting up cellular and non-cellular polyurethanes into liquid reusable polyhydroxyl compounds for an isocyanate polyaddition process comprising reacting the polyurethanes at 150° to 250° C., with lactam melts or equilibrium associates of lactams and water or organic materials containing at least two Zerewitinoff-active hydrogen atoms.

2. The process of claim 1, wherein the reaction is conducted under an elevated pressure of from about 4 to 50 bar when said water is present.

3. The process of claim 1, wherein the lactams used correspond to the general formula

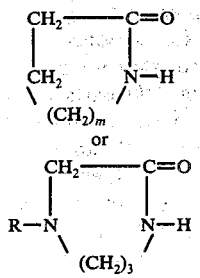

wherein:
m represents 0 or an integer of from 1 to 9, and
R represents an aliphatic radical containing 1 to 10 carbon atoms, araliphatic radical containing 6 to 12 carbon atoms, a pyridine radical or a lower-alkyl-substituted pyridine radical.

4. The process of claim 3, wherein R represents an aliphatic radical of from 1 to 10 carbon atoms.

5. The process of claim 1, wherein equilibrium associates of ε-caprolactam with a compound selected from the group consisting of ethylene glycol, diethylene glycol, diethanolamine, triethanolamine and N-methyl diethanolamine, is used.

6. The process of claim 1, wherein the reaction is accelerated by the addition of 0.0005 to 4% by weight based on the polyurethane of a catalyst.

7. The process of claim 2, wherein the reaction mixture is exposed for 5 to 60 minutes to a temperature of 200°–250° C and/or to the action of basic catalysts in order to at least partly polymerize the lactam used into polyamides.

8. The process of claim 2, wherein the reaction is performed continuously in a screw extruder.

9. The process of claim 2, wherein from 0.5 to 1 part by weight of polyurethane is used for each part of weight of lactam or equilibrium associate.

10. The product of the process of claim 2.

11. In an isocyanate addition process wherein an organic isocyanate is reacted with an active hydrogen containing material, the improvement wherein at least a portion of the active hydrogen containing compound is a material produced by reacting a polyurethane at 150° to 250° C. with lactam melts or equilibrium associates of lactam and water or organic materials containing at least two Zerewitinoff-active hydrogen atoms.

12. The process of claim 11, wherein the lactams used correspond to the general formula:

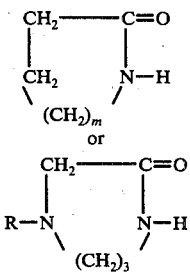

wherein:
m represents 0 or an integer of from 1 to 9, and
R represents an aliphatic radical, araliphatic radical, a pyridine radical or a lower-alkyl-substituted pyridine radical.

13. The product of the process of claim 12.

* * * * *